US010809111B2

(12) United States Patent
Barbanti et al.

(10) Patent No.: US 10,809,111 B2
(45) Date of Patent: *Oct. 20, 2020

(54) APPARATUS AND METHOD FOR MEASURING AN INTERNAL VOLUME OF A MOULD

(71) Applicant: HYPERTEC SOLUTION S.R.L., Rovereto (IT)

(72) Inventors: Giovanni Barbanti, Casalecchio di Reno (IT); Gino Bassi, San Giovanni in Persiceto (IT)

(73) Assignee: HYPERTEC SOLUTION S.R.L., Trento (IT)

( * ) Notice: Subject to any disclaimer, the term of this patent is extended or adjusted under 35 U.S.C. 154(b) by 212 days.

This patent is subject to a terminal disclaimer.

(21) Appl. No.: 16/013,204

(22) Filed: Jun. 20, 2018

(65) Prior Publication Data

US 2018/0299311 A1    Oct. 18, 2018

Related U.S. Application Data

(63) Continuation of application No. 14/893,277, filed as application No. PCT/IB2014/061447 on May 15, 2014, now Pat. No. 10,031,014.

(30) Foreign Application Priority Data

May 24, 2013    (IT) .............................. BO2013A0258

(51) Int. Cl.
*G01F 17/00*    (2006.01)
*G01B 11/00*    (2006.01)

(52) U.S. Cl.
CPC .............. *G01F 17/00* (2013.01); *G01B 11/00* (2013.01)

(58) Field of Classification Search
CPC ................................ G01F 17/00; G01B 11/00
See application file for complete search history.

(56) References Cited

U.S. PATENT DOCUMENTS 6,407,818 B1    6/2002  Whitehouse
6,858,826 B2    2/2005  Mueller
(Continued)

FOREIGN PATENT DOCUMENTS

DE    19545845 A1    6/1997

OTHER PUBLICATIONS

Patent Cooperation Treaty (PCT), International Search Report and Written Opinion of the International Searching Authority for co-pending PCT International Patent Application No. PCT/US2014/061447, International Filing Date May 15, 2014 dated Jul. 16, 2014 (10 pgs).

*Primary Examiner* — David Z Huang
(74) *Attorney, Agent, or Firm* — Wentsler LLC

(57)    ABSTRACT

An apparatus for measuring an internal volume of a mold designed for forming hollow glass containers and divisible into two or more pieces includes: a supporting element configured to support the mold pieces of the mold positioned with respective molding surfaces, delimiting the internal volume of the mold, accessible by an optical inspection device, which is configured to scan the profiles of a surface and obtain information on the distance between the surface and the optical inspection device, the scanning device being movable, relative to the supporting element, by rotation about a longitudinal axis of rotation; a control unit connected to an actuator to produce relative rotation between the optical inspection device and the supporting element.

20 Claims, 4 Drawing Sheets

(56) References Cited

U.S. PATENT DOCUMENTS 10,031,014 B2 * 7/2018 Barbanti ................. G01F 17/00
2004/0017563 A1 1/2004 James et al.
2007/0157776 A1 7/2007 Sorensen et al.
2012/0304763 A1 12/2012 Troxler

* cited by examiner

APPARATUS AND METHOD FOR MEASURING AN INTERNAL VOLUME OF A MOULD

TECHNICAL FIELD

This invention relates to an apparatus and a method for measuring an internal volume of a mould designed for forming hollow glass containers and divisible into two or more pieces.

In general, the invention relates to an apparatus and a method for measuring a volume inside moulds of any type; more specifically, the invention relates to the measuring of the volume inside moulds designed for forming glass containers (such as, for example, bottles, jars, test tubes).

BACKGROUND ART

In this field, the solutions in use comprise filling the moulds with a reference liquid (for example water), after having weighed the reference liquid (in a greater amount) and then weighing the liquid remaining and, by difference, obtaining the volume of liquid contained in the mould.

However, this approach has several problems.

Firstly, this method is not very precise because the density of the reference liquid is not known exactly.

The moulds have air vent holes which must be sealed and the joints between the mould pieces must also be sealed to prevent escape of the liquid, and this operation is not easy.

Moreover, the need to wet the mould prevents easily measuring the capacity of all the moulds produced.

Patent document US2004/017563 discloses a system for measuring various features of an object, including the volume of the object itself.

Patent document U.S. Pat. No. 6,407,818B1 discloses a system for measuring the shape of an object in transit on a belt for being cut.

However, these patent documents do not deal in particular with the problem of how to accurately measure the volume inside a mould having an inner surface with a double curvature, which is typical of a mould used for a container (for example, a glass bottle).

AIM OF THE INVENTION

The aim of this invention is to provide an apparatus and a method for measuring an internal volume of a mould which overcome the above-mentioned drawbacks of the prior art.

An aim of this disclosure is to provide an apparatus and a method for measuring an internal volume of a mould which are precise and applicable in a way that is not invasive for the mould.

A further aim of this disclosure is to provide an apparatus and a method for measuring an internal volume of a mould which are particularly fast to execute and simple to use.

Therefore, the disclosure relates to an apparatus for measuring an internal volume of a mould designed for forming hollow glass containers and divisible into two or more pieces.

More specifically, the mould comprises two half-moulds, comprising two pieces, each of which forms a cavity defining a moulding surface.

In general, the mould also comprises a base, constituting a third mould piece; the base defines a relative moulding surface, configured to form the inside bottom wall of the moulding volume inside the mould, when the base is coupled to the two half-moulds.

For this reason, each mould piece defines a relative moulding surface, which combines with the corresponding moulding surfaces of the other mould pieces to delimit the volume inside the mould.

The apparatus comprises a supporting element for supporting the mould pieces (the mould pieces preferably comprise two half-moulds and a base) during the measurement.

More specifically, the supporting element is configured for supporting the mould pieces of the mould positioned with the respective moulding surfaces accessible to optical inspection means.

The apparatus comprises at least one laser scanning device, for example a so-called "profilometer"; it should be noted that the scanning device constitutes an optical inspection device.

The laser scanning device is configured to scan the profiles of a surface and obtain information on the distance between the surface and the device itself.

The apparatus also comprises a slide, to which the scanning device is connected.

The slide is movable relative to the supporting element along a longitudinal movement axis (in the sense that at least one of the two is movable relative to the other, preferably by translation, more preferably along the longitudinal movement axis); the movement axis has a predetermined geometrical relation (that is, a position) relative to the supporting element.

Moreover, the scanning device is movable by rotation about a longitudinal axis of rotation parallel to the axis of movement, relative to the supporting element (in the sense that at least one of the two is movable relative to the other, preferably by rotation, and more preferably about the longitudinal axis of rotation).

The apparatus also comprises a control unit designed for controlling the movements of the scanning device.

The control unit is connected to one or more actuators to produce a relative translation between the slide and the supporting element and a relative rotation between the scanning device and the supporting element. The actuators are configured to reverse the direction of movement.

This allows the scanning device to be moved above the mould piece coupled to the supporting element, at a distance from the moulding surface to be scanned, for scanning, in a sequence of alternate movements, different portions of the moulding surface.

The images acquired by the scanning device for the various portions of the moulding surface are made available to a processor configured to combine them for deriving information on the profile of the moulding surface of the mould piece in its entirety.

The fact of scanning the moulding surfaces in a plurality of passes (for example from one to seven passes, more preferably five for the mould pieces consisting of the half-moulds and three for the mould pieces consisting of the bases) is important for allowing the use of a high precision scanning device for scanning a surface having an extension greater than the scanning area of the laser scanning device.

In effect, as is known, in order to obtain high scanning precision and resolution, the scanning area must be small; moreover, the rays emitted by the scanning device must be substantially perpendicular to the surface to be scanned.

For this reason, the fact that the scanning device rotates makes it possible to vary the inclination of the scanning device relative to the supporting surface, to keep the rays emitted by the scanning device substantially perpendicular to the moulding surface during the scanning, despite the surface being curved (the curvature may be of a particular shape, but usually the surface has a geometry which is approximately cylindrical).

For this reason, the mould piece is connected to the supporting element in such a way that an axis along which the mould piece is elongate is positioned longitudinally, that is to say, parallel to the longitudinal movement axis of the slide.

Preferably, each of the surface portions is scanned keeping the inclination of the scanning device constant and translating the scanning device together with the slide; at the end of each translation, in order to scan a different surface portion, the control unit rotates the scanning device by a predetermined angle, to then perform a new translation (alternatively, a dual strategy may be followed, wherein the scanning device is rotated without translating it, and it is then translated by a predetermined quantity and a new portion of the surface is then scanned).

This allows a particularly precise measurement, as in the translational movement with a constant inclination there is greater guarantee that the distance between the scanning device and the surface does not vary (this is another factor which improves the precision of the measurement).

Preferably, the apparatus comprises (at least) two separate actuators, a first actuator for translating the scanning device (that is, the slide), a second actuator for rotating the scanning device.

Preferably, the scanning device translates together with the slide.

Preferably, the slide is configured to move (by translating) relative to a frame; preferably, the supporting element is stationary (stationary relative to the frame) during movement of the slide.

Preferably, the scanning device is movably connected to the slide to rotate relative to it.

Preferably, the slide has an arched shape with the concavity facing towards the supporting element. This also increases the precision of the measurement and makes it possible to keep constant both the inclination and the distance of the scanning device relative to the surface to be scanned.

The fact of carrying out the scanning in a plurality of successive passes means that it is necessary to subsequently make up the images of the scanned portions; this is not simple and could result in errors.

Therefore, the control unit is programmed to command a sequence of movements of the scanning device alternately along the longitudinal movement axis and by rotation about the longitudinal axis of rotation in order to scan a plurality of portions of the moulding surface of the mould piece, so that any zone of the moulding surface is included in at least one of the portions.

For that purpose, for reducing the probability of error and to simplify the operations, the apparatus is equipped with a reference element, visible by the scanning device and configured to generate points of discontinuity (in general meaning any geometrical element or recognisable graphic) recognisable and present in all the images (that is, scans) relating to the portions of the moulding surface of the mould piece.

Thus, this reference element is positioned in such a way as to be intercepted by the (laser of the) scanning device; moreover, the scanning device is moved in such a way as to perform a plurality of scans of at least one portion of the reference element, at least one for each scanned portion of the moulding surface of the mould piece.

Therefore, preferably, the apparatus comprises a reference element located at a fixed position relative to the supporting element and provided with a plurality of reference points spaced in a predetermined manner and configured to generate corresponding points of discontinuity in an image of the reference element itself captured by the scanning device.

The control unit is programmed to command a movement of the scanning device in the proximity of the reference element to scan at least one part including at least one of the reference points, at the start or at the end of the translation or rotation movements of the sequence, in such a way that all the portions scanned of the moulding surface of the mould piece include at least one of the reference points of the reference element.

Preferably, the element is aligned with the reference element along the longitudinal movement axis, to be intercepted by the scanning device at the start or at the end of the translation movements along the axis (movements of the scanning device together with the slide).

Preferably, the reference element is curved and the concavity faces away from the supporting element (in a similar manner to the concavity of the mould piece). Preferably, the reference element is shaped like a half ring.

Preferably, the reference points are angularly spaced along the half ring.

Preferably, the reference element has at least a first and a second surface which are offset by a predetermined known distance along a viewing path of the scanning device.

This allows a step of calibrating the scanning device, to allow compensation of a measuring error due to variation of the distance between the surfaces scanned and the scanning device.

Preferably, the scanning device is movable by rotating along a circular arc having the concavity facing the supporting element; preferably, the circular arc is defined by a guide which is integral with the slide and the scanning device and coupled to the slide for movement along the guide, thus rotating about the longitudinal axis of rotation, which contains the centre of the circular arc in all the positions adopted by the slide during its translation movement.

Preferably, the slide is in turn coupled to a guide to move along the longitudinal movement axis.

Preferably, the guide is connected to the frame of the apparatus.

Thus, the slide is connected to the frame of the apparatus.

Preferably, the supporting element is mounted on a carriage movable along a transversal direction (substantially perpendicular to the longitudinal movement axis); consequently, the carriage (and with it the supporting element) is movable along the direction transversal to the slide.

That gives the apparatus a further degree of freedom, in the relative movement between the scanning device and the supporting element (that is, the mould piece to be scanned).

In practice, the scanning device, relative to the supporting element (that is, the mould piece to be scanned) is movable by translating along the longitudinal direction (defined by the axis of longitudinal movement), by translation along a transversal direction, and by rotation about the longitudinal axis of rotation (parallel to the longitudinal axis of movement).

This allows surfaces to be also scanned which have a substantially flat base (for example, in the case of the base of the mould), without losing the condition of being substantially perpendicular between the laser beam of the scanning device and the surface to be scanned (useful condition for having a high level of precision in the measurement).

The apparatus comprises the processing means, which are programmed for analysing the scanned images and processing them to obtain the value of the volume inside the mould.

More specifically, the processing means are programmed for performing the following steps:

for each mould piece scanned, storing (at least in a temporary memory) a plurality of profiles (or images) relating to the scanned portions of the moulding surface;

for each mould piece scanned, combining the profiles (or images) of the plurality of profiles, to obtain a single image relating to the moulding surface of the mould piece;

combining the information of the profiles relating to the scanned moulding surfaces for all the mould pieces of the mould, for calculating the volume inside the mould.

For this reason, this invention provides a method for measuring an internal volume of a mould (more specifically a mould designed for forming hollow glass containers and divisible into two or more pieces).

The method comprises the following steps:

coupling at least one of the mould pieces to the supporting element in such a way that a moulding surface of the mould piece, delimiting the internal volume of the mould, is accessible to optical inspection means;

preparing the scanning device;

causing the scanning device to perform a sequence of movements alternately along the longitudinal movement axis, having a predetermined position relative to the supporting element, and by rotation about the longitudinal axis of rotation parallel to that movement axis, in order to scan a plurality of portions of the moulding surface of the mould piece, until the scanning device has scanned the entire moulding surface.

Preferably, the method comprises a step of preparing a reference element located at a fixed position relative to the supporting element and provided with a plurality of reference points spaced in a predetermined manner and configured to generate corresponding points of discontinuity in an image of the reference element itself captured by the scanning device.

In light of this, preferably, the movements of the scanning device alternately by translation along the longitudinal movement axis and by rotation about the longitudinal axis of rotation are performed in such a way that all the scanned portions of the moulding surface of the mould piece also include at least one of the reference points of the reference element.

The method comprises repeating the above-mentioned scanning operations (capturing image data) for all the mould pieces which make up the mould.

In addition, the method comprises a step of processing the data collected during the scanning (using the scanning device), for combining it and calculating the volume inside the mould (as described above).

It should also be noted that, before the scanning, the mould pieces are coupled to the supporting element.

In this regard, it should be noted that the apparatus comprises a single supporting element; in this case, the operations for scanning the moulding surfaces of the various mould pieces are performed in sequence, one after the other, after unloading the mould piece already scanned and loading the next mould piece.

Alternatively, the apparatus comprises a plurality of supporting elements, for loading the mould pieces all together.

Moreover, the supporting elements are associated with the same carriage or with two or more carriages, mobile relative to the frame independently from each other.

The presence of a plurality of carriages reduces the time necessary for measuring the volume in the mould, as it allows a part of the operations for loading a mould piece to be performed at the same time as the performance of the operations for scanning another mould piece; in light of this, it should be noted that the scanning operations are controlled automatically by the control unit.

BRIEF DESCRIPTION OF THE DRAWINGS

These and other features will become more apparent from the following detailed description of a preferred, non-limiting embodiment of the invention, with reference to the accompanying drawings, in which.

DETAILED DESCRIPTION OF PREFERRED EMBODIMENTS OF THE INVENTION

Figure 1:
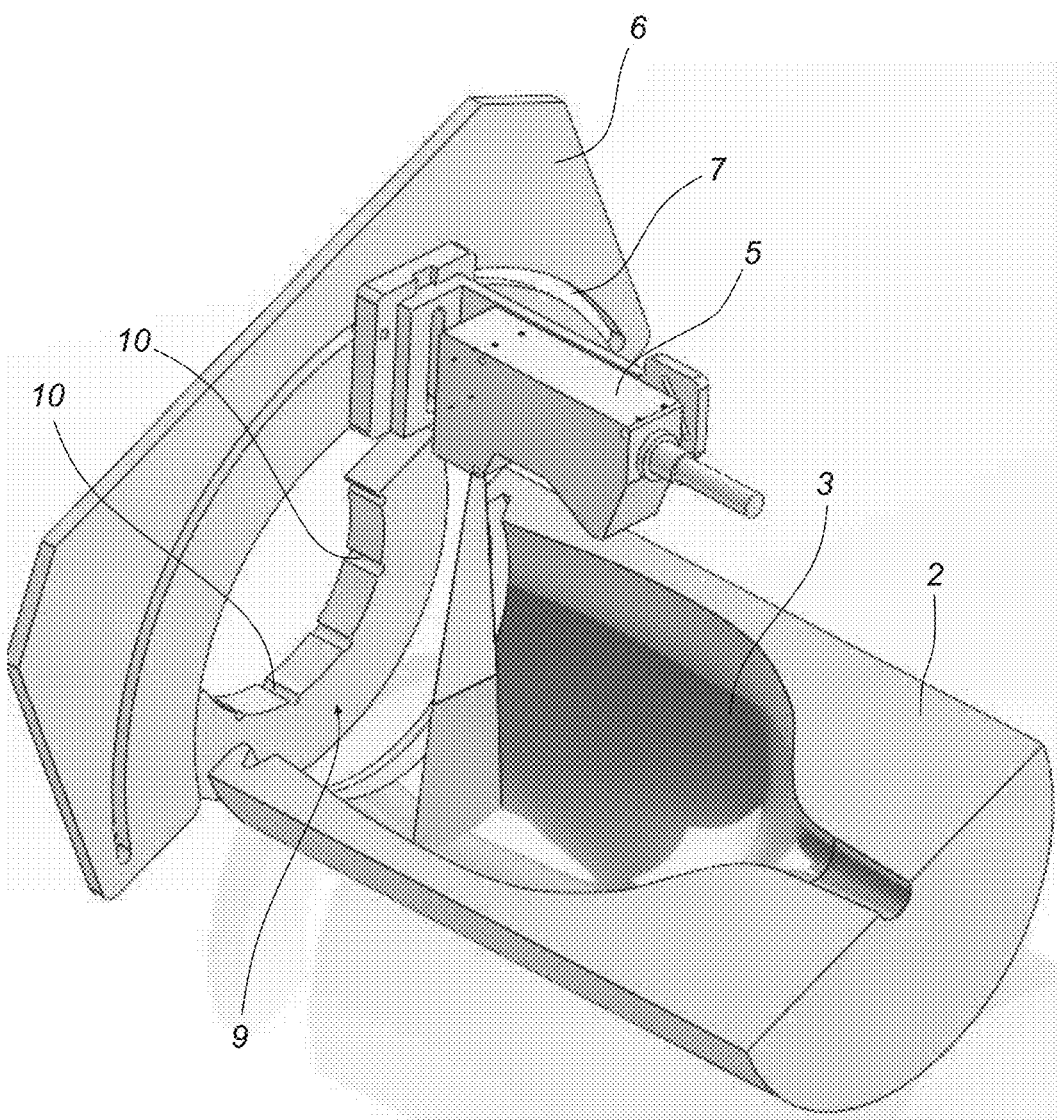
FIG. 1 is a perspective view of a portion of the apparatus according to this invention.
Figure 2:
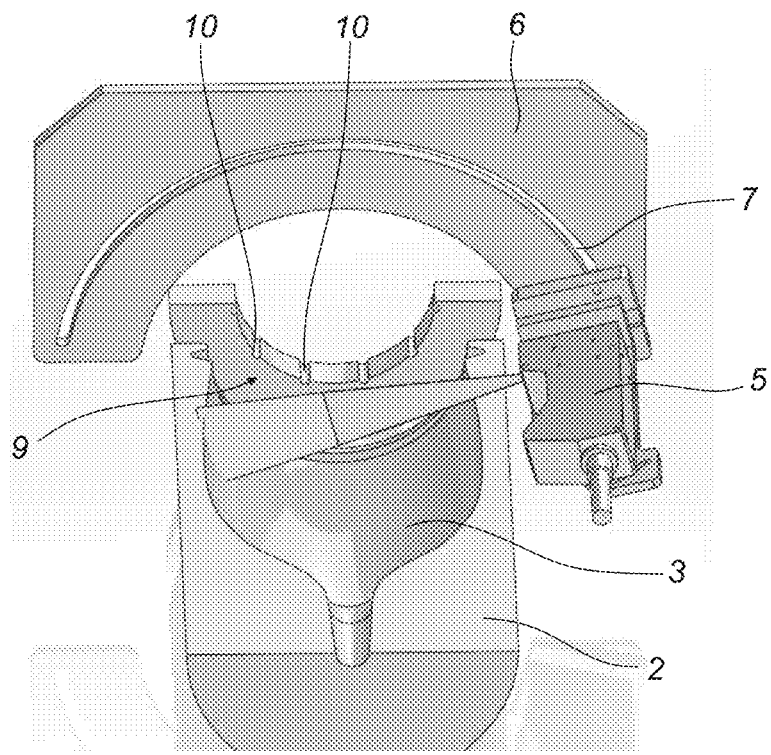
FIG. 2 is a different perspective view of the portion of the apparatus of FIG. 1.
Figure 3:
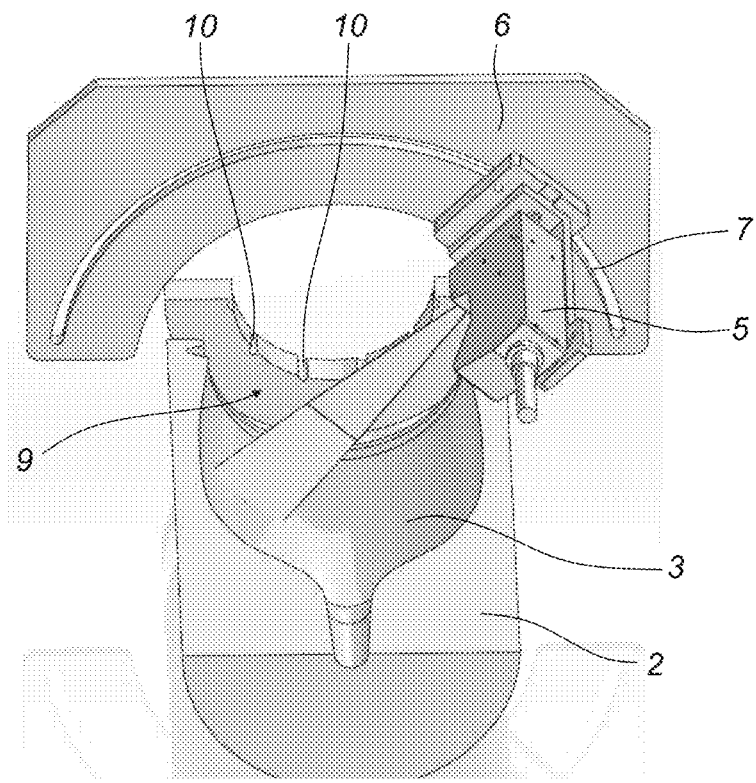
FIG. 3 illustrates the portion of the apparatus of FIG. 2 with the scanning device in a position rotated relative to FIG. 2.
Figure 4:
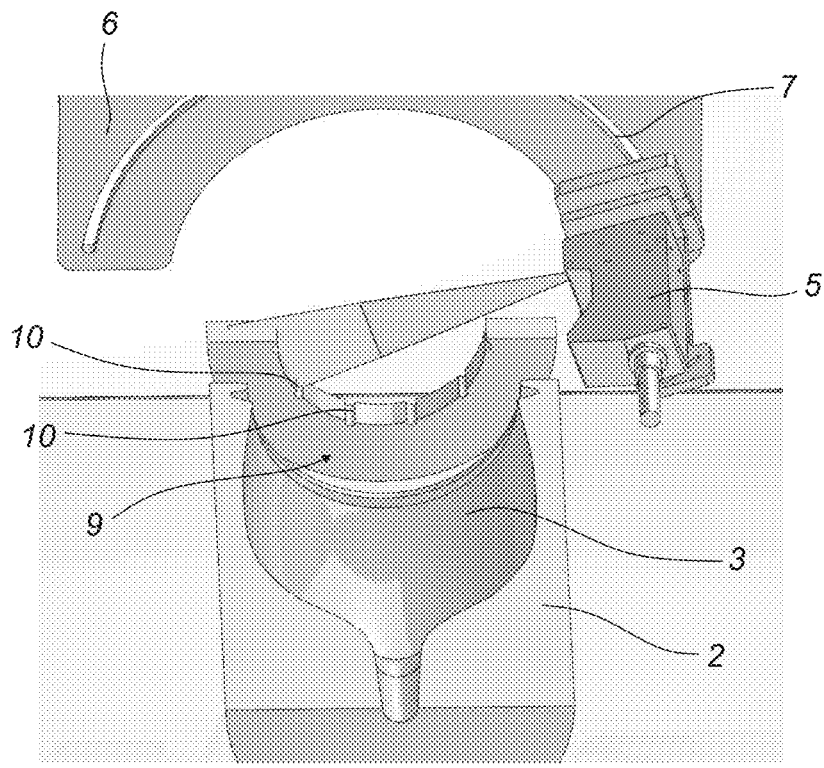
FIG. 4 illustrates the portion of the apparatus of FIG. 3 with the scanning device in a position translated relative to FIG. 3.
Figure 5:
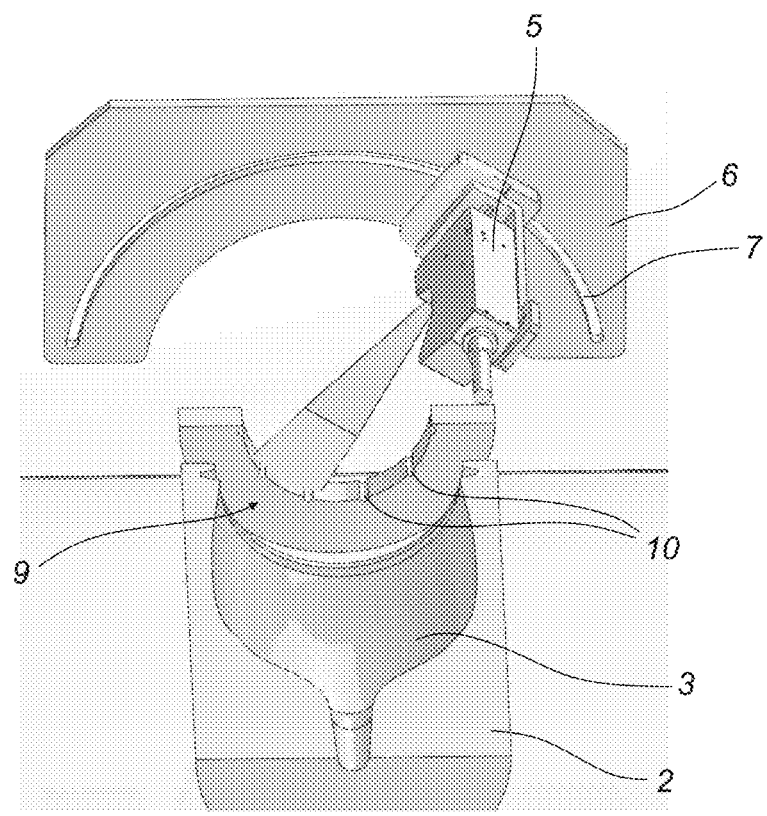
FIG. 5 illustrates the portion of the apparatus of FIG. 4 with the scanning device in a position rotated relative to FIG. 4.

The numeral 1 in the accompanying drawings denotes an apparatus for measuring an internal volume of a mould designed for forming hollow glass containers and divisible into two or more pieces 2.

Each mould piece 2 of the mould has a relative moulding surface 3, configured to delimit the volume inside the mould, when the mould pieces interact to form the mould.

The apparatus comprises a supporting element 4 configured to support at least one mould piece 2 or, preferably, all the mould pieces of the mould.

More specifically, the supporting element 4 is shaped to support the mould pieces 2 positioned with the respective moulding surfaces 3 accessible to visual inspection means.

For example, the supporting element 4 has a V-shaped surface, configured to receive and support the mould piece 2, resting with a respective back opposite the moulding surface 3. Moreover, the supporting element 4 comprises stop elements for locking in position the mould piece 2 on the supporting element 4, preventing relative movements.

Moreover, the apparatus 1 comprises a laser scanning device 5.

The scanning device 5 is of a per se known type in the prior art; it is configured to capture images of a surface and obtain information on the distance between the surface and the device itself.

Figure 6:
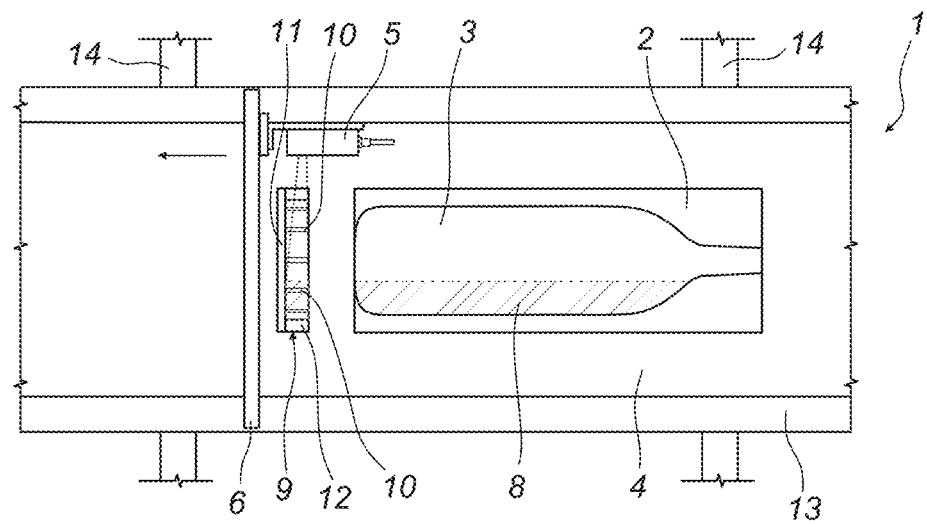
FIG. 6 is a plan view of the apparatus of FIG. 1.
Figure 7:
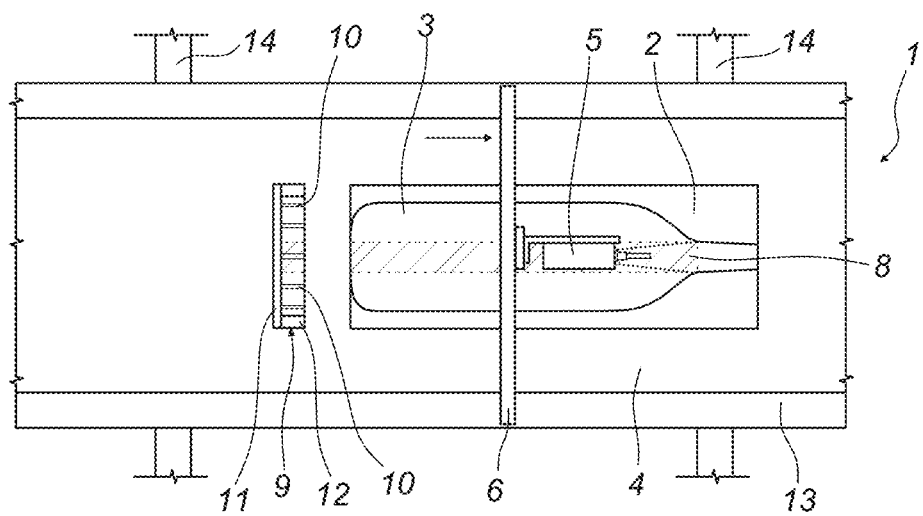
FIGS. 7 and 8 illustrate the apparatus of FIG. 6, with the scanning device in different operating positions.
Figure 8:
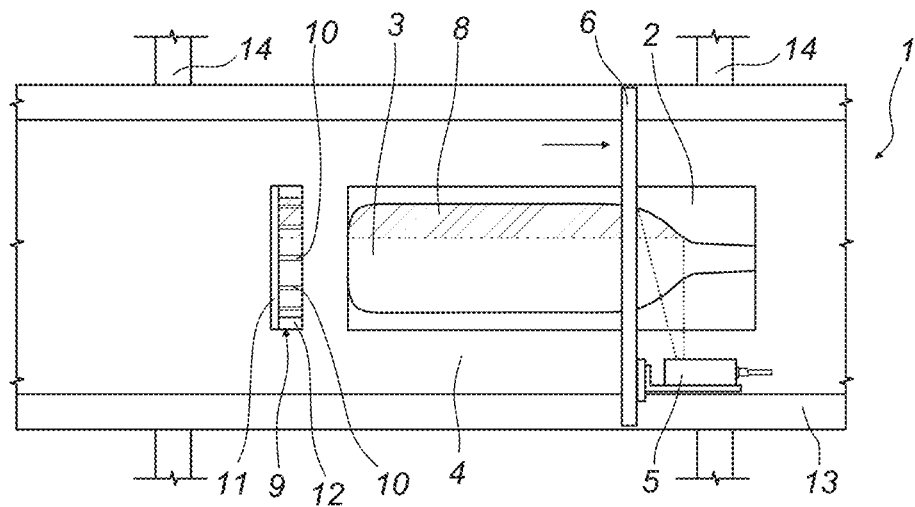

The apparatus 1 also comprises a slide 6 movable relative to the supporting element 4 along a longitudinal movement axis; in practice, this means that the slide 6 is movable relative to the supporting element 4 (for translating) in a longitudinal direction (it should be noted that the longitudinal direction is illustrated in FIGS. 6-8 by arrows).

The scanning device 5 is preferably connected to the slide 6.

In the example illustrated, the scanning device 5 is movably coupled to the slide 6, to follow a curved trajectory, so that the scanning device 5 may adopt rotated positions (with different inclinations) relative to the supporting element 4.

In the example illustrated, the scanning device 5 is movably coupled to a guide 7 (for example a groove) defined by the slide 6, shaped according the curved trajectory.

For this reason, in practice, the supporting element is movable by rotation about a longitudinal axis (referred to hereafter as axis of rotation) parallel to the axis of movement.

This configuration facilitates the scanning of moulding surfaces having an elongate shape; in effect, operatively, the mould piece 2 is positioned on the supporting element 4 in such a way that it is elongate along the longitudinal direction.

For this reason, the translational movement (of the slide 6) moves the scanning device 5 along the mould piece 2 according to the longitudinal extension of the piece. On the other hand, the rotational motion makes it possible to orient the scanning device 5 substantially perpendicularly to a predetermined portion of the moulding surface 3 of the mould piece 2.

If the moulding surface 3 of the mould piece 2 has a substantially cylindrical geometry, the condition of being substantially perpendicular remains during the movement of the scanning device 5 for longitudinal translation.

Moreover, the apparatus 1 comprises a control unit (not illustrated, of per se known type, consisting for example of a suitably programmed electronic card).

The control unit is connected to movement means configured to produce a relative translation between the slide 6 and the supporting element 4 and a relative rotation between the scanning device 5 and the supporting element 4.

In principle, these movement means also comprise a single actuator, because the above-mentioned translation and rotation movements are preferably uncoupled from one another (that is to say, they are not performed at the same time, but in succession).

However, preferably, the movement means comprise a first actuator (preferably of an electromechanical type), to move the slide 6 longitudinally, and a second actuator (preferably of a pneumatic type or an electric motor, for example a stepping motor), for moving the scanning device 5 by rotation (that is to say, along the curved path).

Moreover, preferably, the apparatus comprises a reference optical element (for example an optical ruler preferably defined by a linear encoder), positioned along the longitudinal direction of translation of the slide.

The purpose of the optical reference element is to provide the time of the acquisitions; that is, during the translation along the longitudinal movement axis, the scanning device makes a plurality of acquisitions (which make up a portion of the moulding surface), in succession; the instants of acquiring the plurality of acquisitions are determined (by the control unit) as a function of the optical reference element.

Thus, the control unit is connected to the first and second actuators for controlling the movements according to a predetermined logic (with which the control unit is programmed, that is to say, stored in the control unit).

More specifically, the control unit is programmed to command a sequence of movements of the scanning device 5, alternatively:
along the longitudinal movement axis and
by rotation about the longitudinal axis of rotation.

The control unit is programmed to command the movement of the scanning device 5 (relative to the supporting elements 4; it should be noted that it is always possible, in theory, to keep the scanning device 5 stationary and move the supporting element 4, to obtain the same relative movements), in the sequence of movements, for scanning a plurality of portions 8 of the moulding surface 3 of the mould piece 4, in such a way that any zone of the moulding surface 3 is within at least one of the portions 8.

In the example illustrated, the portions 8 are elongate longitudinally.

This is the result of a programming logic of the control unit, which comprises performing the rotations when the device 5 is deactivated and keeping the device 5 active (that is, in a profiles capturing mode) during the longitudinal translation movements.

Preferably, the programming logic of the control unit comprises performing the rotations when the scanning device 5 is positioned on the side of one of the ends of the mould piece 2.

It should be noted that there is also an alternative programming logic of the control unit, wherein the translations of the scanning device 5 occur when the scanning device 5 is deactivated and the rotations occur when the scanning device 5 is active; in this case, the surfaces corresponding to the portions 8 are transversal to the axis along which the mould piece 2 extends.

Preferably, the apparatus 1 comprises a reference element 9, comprising a predetermined geometry (and known to the apparatus 1 itself).

The reference element 9 is operatively positioned in a fixed position relative to the supporting element 4.

The reference element 9 is equipped with a plurality of reference points 10 spaced in a predetermined manner on the reference element 9.

These reference points 10 are configured to generate corresponding points of discontinuity in an image of the reference element 9 captured by the scanning device 5 (for example, they are produced by notches or geometrical shapes which can be detected by the profilometer (that is, by the scanning device) or by means of zones of chromatic contrast or by passage from light to dark).

The control unit is programmed to command a movement of the scanning device 5 in the proximity of the reference element 9 for scanning at least a part comprising at least one of the reference points 10.

More specifically, the control unit is programmed to command the movement of the scanning device 5 in the proximity of the reference element 9 (for scanning at least a part comprising at least one of the reference points 10) at the start or at the end of the translation or rotation movements of the sequence, in such a way that all the scans corresponding to the scanned portions 8 of the moulding surface 3 of the mould piece 2 comprise (in terms of scanned profile) at least one of the reference points 10 of the reference element.

Preferably, the reference element 9 has the shape of a half ring and the reference points 10 are angularly spaced along the half ring.

Preferably, the reference element 9 has a surface 11 offset by a predetermined known distance (along a viewing path of the scanning device) relative to at least one other surface of the reference element 9.

For example, the reference element 9 has an annular surface 11 spaced (forming a step) from another annular surface 12 defining the reference points 10.

Preferably, the supporting element 4 is mounted on a carriage 13.

The carriage is movable along a transversal direction, perpendicular to the longitudinal movement axis; consequently, the carriage 13 is movable along the direction transversal to the slide 6.

More specifically, the carriage 13 is mounted on tracks 14 (or other guide means) which are transversal to the longitudinal direction of translation of the slide 6.

The tracks are connected to a frame (for resting on the ground) of the apparatus (not illustrated).

Preferably (in an embodiment not illustrated), the apparatus 1 comprises two or more of the carriages 13.

For this reason, the invention provides a method for measuring an internal volume of a mould; more specifically, of a mould designed for forming hollow glass containers and divisible into two or more pieces 2.

The method comprises the following steps:

coupling a piece 2 to the supporting element 4;

moving the supporting element 4 (using the carriage 13) to position it in a working area in which the scanning device 5 is active;

causing the scanning device 5 to perform a sequence of movements alternately along the longitudinal movement axis and by rotation about the longitudinal axis of rotation, in order to scan a plurality of portions 8 of the moulding surface 3 of the mould piece 2, until the scanning device has scanned the entire moulding surface.

More specifically, during the execution of a sequence of movements of the scanning device 5, the scanning device 5 is kept:

active (to capture images of a scanned surface), during the movements by longitudinal translation (along the direction of extension of the mould piece 2), and deactivated during the movements by rotation, or vice versa.

It should be noted that the movements by longitudinal translation are also alternated with movements by transversal translation (using the movement carriage 13 of the supporting element 4), as an alternative to the above-mentioned movements by rotation (this to allow scanning of the base of the mould, for example, or of other surfaces having particular geometries).

In any case, preferably, the movements of the scanning device 5 alternately by translation along the longitudinal movement axis and by rotation about the longitudinal axis of rotation (or by translation along a transversal direction) are performed in such a way that all the portions 8 scanned of the moulding surface 3 of the mould piece 2 include at least one of the reference points 10 of the reference element 9.

What is claimed is:

1. An apparatus for measuring an internal volume of a mould designed for forming hollow glass containers and divisible into two or more pieces, the apparatus comprising:

a supporting element, configured to support the mould pieces positioned to allow respective moulding surfaces, delimiting the internal volume of the mould, to be accessible for optical inspection;

an optical inspection device, configured to scan profiles of a surface and obtain information on the distance between the surface and the optical inspection device itself, wherein the optical inspection device and the supporting element are movable relative to one another, by rotation about a longitudinal axis of rotation;

a control unit connected to one or more actuators to produce a relative rotation between the optical inspection device and the supporting element;

a reference element located at a fixed position relative to the supporting element and provided with a plurality of reference points spaced in a predetermined manner and configured to generate corresponding points of discontinuity in an image of the reference element captured by the optical inspection device, wherein the reference element is curved and has a concavity facing away from the supporting element, and wherein the control unit is programmed to command a relative rotation between the reference element and the optical inspection device, to scan at least one part including at least one of the reference points.

2. The apparatus according to claim 1, wherein the control unit is programmed to command a sequence of movements of the relative rotation between the supporting element and the optical inspection device, by rotation about the longitudinal axis of rotation, in order to scan a plurality of portions of the moulding surface of the mould piece, so that any zone of the moulding surface is included in at least one of the portions.

3. The apparatus according to claim 2, wherein the control unit is programmed to command the optical inspection device to scan the at least one part including the at least one of the reference points, at the start or at the end of the translation or rotation movements of the sequence, in such a way that all the scans of the portions of the moulding surface of the mould piece include at least one of the reference points of the reference element.

4. The apparatus according to claim 3, wherein the reference element has the shape of a ring and the reference points are angularly spaced along the ring.

5. The apparatus according to claim 3, wherein the reference element has at least a first and a second surface which are offset by a predetermined known distance along a viewing path of the scanning device.

6. The apparatus according to claim 1, wherein the scanning device is movably coupled to a slide to rotate about the longitudinal axis of rotation.

7. The apparatus according to claim 1, wherein the scanning device is relatively movable with respect to the supporting element, by rotation.

8. The apparatus according to claim 1, comprising a slide coupled to a guide to move along a longitudinal movement axis.

9. The apparatus according to claim 1, wherein the supporting element is mounted on a carriage which is movable along a transversal direction, perpendicular to a longitudinal movement axis.

10. The apparatus according to claim 1, wherein the optical inspection device is stationary and the supporting element is movable with respect to the optical inspection device.

11. The apparatus according to claim 10, wherein the supporting element is actuated to undergo a sequence of movements, so that a plurality of portions of the moulding surface of the mould piece are scanned.

12. The apparatus according to claim 11, wherein scanned portions are elongate longitudinally.

13. The apparatus according to claim 1, wherein the control unit is programmed for keeping the optical inspection device deactivated during the rotation movement.

14. The apparatus according to claim 1, wherein the predetermined geometry of the reference element is known to the apparatus.

15. The apparatus according to claim 1, wherein the reference points of the reference element include geometrical shapes which can be detected by the optical inspection device.

16. The apparatus according to claim 1, wherein the reference points of the reference element include zones of chromatic or darkness contrast, which can be detected by the optical inspection device.

17. The apparatus according to claim 1, wherein the reference element has an annular surface spaced from another surface defining the reference points.

18. An apparatus for measuring an internal volume of a mould designed for forming hollow containers and divisible into two or more pieces, the apparatus comprising:
- a supporting element, configured to support the mould pieces positioned to allow respective moulding surfaces, delimiting the internal volume of the mould, to be accessible for optical inspection;
- an optical inspection device, configured to scan profiles of a surface and obtain information on the distance between the surface and the optical inspection device itself, wherein the optical inspection device and the supporting element are movable relative to one another, by rotation about a longitudinal axis of rotation;
- a control unit connected to one or more actuators to produce a relative rotation between the optical inspection device and the supporting element;
- a reference element located at a fixed position relative to the supporting element and provided with a plurality of reference points spaced in a predetermined manner and configured to generate corresponding points of discontinuity in an image of the reference element captured by the optical inspection device,
- wherein the reference element is curved and has a concavity facing away from the supporting element and has an annular surface spaced from another surface defining the reference points, and
- wherein the control unit is programmed to command a relative rotation between the reference element and the optical inspection device, to scan at least one part including at least one of the reference points.

19. A method for measuring an internal volume of a mould designed for forming hollow glass containers and divisible into two or more pieces, wherein the method comprises the following steps:
- coupling at least one of the mould pieces to a supporting element in such a way that a moulding surface of the mould piece, delimiting the internal volume of the mould, is accessible for optical inspection;
- preparing an optical inspection device configured to capture images of a surface and obtain information on the distance between the surface and the optical inspection device itself;
- causing a sequence of relative movements, by rotation about a longitudinal axis of rotation, between the supporting element and the optical inspection device, in order to scan a plurality of portions of the moulding surface of the mould piece, until the optical inspection device has scanned the entire moulding surface,
- wherein a reference element located at a fixed position relative to the supporting element and provided with a plurality of reference points spaced in a predetermined manner and configured to generate corresponding points of discontinuity in an image of the reference element captured by the scanning device,
- wherein the reference element is curved and has a concavity facing away from the supporting element, and
- wherein a relative rotation between the reference element and the optical inspection device is provided, to scan at least one part including at least one of the reference points.

20. The method according to claim 19, wherein the relative movements between the reference element and the of the optical inspection device are performed alternately by translation along a longitudinal movement axis and by rotation about the longitudinal axis of rotation, in such a way that all the scans comprising the portions of the moulding surface of the mould piece also include at least one of the reference points of the reference element.

* * * * *